United States Patent
Zhang et al.

(10) Patent No.: US 8,386,486 B2
(45) Date of Patent: Feb. 26, 2013

(54) METHOD FOR FACILITATING SOCIAL NETWORKING BASED ON FASHION-RELATED INFORMATION

(75) Inventors: Wei Zhang, Corvallis, OR (US);
Takashi Matsumoto, Tokyo (JP);
Maurice K. Chu, San Mateo, CA (US);
James M. A. Begole, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 401 days.

(21) Appl. No.: 12/166,581

(22) Filed: Jul. 2, 2008

(65) Prior Publication Data

US 2010/0005105 A1  Jan. 7, 2010

(51) Int. Cl.
*G06F 7/00* (2006.01)
(52) U.S. Cl. ......... 707/737; 707/915; 382/111; 382/181
(58) Field of Classification Search .................. None
See application file for complete search history.

(56) References Cited

U.S. PATENT DOCUMENTS

| | | | | |
|---|---|---|---|---|
| 5,751,286 | A * | 5/1998 | Barber et al. ................. | 715/835 |
| 6,578,023 | B1 * | 6/2003 | Kagami et al. ................. | 706/54 |
| 6,833,865 | B1 * | 12/2004 | Fuller et al. ................. | 348/231.2 |
| 7,343,365 | B2 * | 3/2008 | Farnham et al. ............. | 715/853 |
| 7,627,502 | B2 * | 12/2009 | Cheng et al. ................. | 705/27.2 |
| 7,680,770 | B1 * | 3/2010 | Buyukkokten et al. ....... | 707/758 |
| 2003/0014759 | A1 * | 1/2003 | Van Stam ....................... | 725/97 |
| 2006/0106631 | A1 * | 5/2006 | Waller ............................ | 705/1 |
| 2006/0122974 | A1 * | 6/2006 | Perisic ............................ | 707/3 |
| 2006/0149638 | A1 * | 7/2006 | Allen ............................... | 705/26 |
| 2008/0002892 | A1 * | 1/2008 | Jelonek et al. ................. | 382/224 |
| 2008/0052371 | A1 * | 2/2008 | Partovi et al. ................. | 709/217 |
| 2008/0082426 | A1 * | 4/2008 | Gokturk et al. ................. | 705/27 |
| 2008/0134294 | A1 * | 6/2008 | Mattox et al. ...................... | 726/4 |
| 2008/0279419 | A1 * | 11/2008 | Kluesing et al. .............. | 382/100 |
| 2009/0012863 | A1 * | 1/2009 | Saephan .......................... | 705/14 |
| 2009/0018926 | A1 * | 1/2009 | Buehlman ........................ | 705/26 |
| 2009/0030927 | A1 * | 1/2009 | Cases et al. .................... | 707/102 |
| 2009/0116766 | A1 * | 5/2009 | Matsumoto et al. .......... | 382/311 |
| 2009/0319288 | A1 * | 12/2009 | Slaney et al. ...................... | 705/1 |
| 2010/0223261 | A1 * | 9/2010 | Sarkar ........................... | 707/726 |

OTHER PUBLICATIONS

Anguelov et al., "Contextual Identity Recognition in Personal Photo Albums" 2007 IEEE, Computer Vision and Pattern Recognition, 2007. CVPR '07.*
Zhang et al., "Automated Annotation of Human Faces in Family Albums" 2003 ACM, International Multimedia Conference Proceedings of the eleventh ACM international conference on Multimedia.*
Kumar et al., "Trawling the Web for Emerging Cyber-Communities", May 17, 1999 Elsevier, Computer Networks vol. 31 issues 11-15, pp. 1481-1493.*

(Continued)

*Primary Examiner* — Fred I Ehichioya
*Assistant Examiner* — Richard Bowen
(74) *Attorney, Agent, or Firm* — Shun Yao; Park, Vaughan, Fleming & Dowler LLP

(57) ABSTRACT

One embodiment of the present invention provides a system for facilitating social networking based on fashion-related information. During operation, the system receives fashion-related information from a user. Next, the system extracts the user's fashion preferences from the received information and compares the user's fashion preference with other users' fashion preferences. Finally, the system groups users based on similarity of their fashion preferences.

21 Claims, 6 Drawing Sheets

OTHER PUBLICATIONS

Kim, Mi-Jung, "Consumer perceptions of apparel products in Internet shopping," a Dissertation Submitted to Oregon State University, copyright Dec. 20, 2007, http://ir.library.oregonstate.edu/xmlui/bitstream/handle/1957/7485/Dissertation%20_Original_.pdf?sequence=1, pp. 1,13-16,23,28-29,35-36,41 and 44.*

North et al., "The importance of apparel product attributes for female buyers," Journal of Family Ecology and Consumer Sciences, vol. 31, 2003.*

Schafer et al., "Collaborative Filtering Recommender Systems," Springer-Verlag Berlin Heidelberg 2007, The Adaptive Web, LNCS 4321, pp. 291-324.*

* cited by examiner

METHOD FOR FACILITATING SOCIAL NETWORKING BASED ON FASHION-RELATED INFORMATION

RELATED APPLICATION

The instant application is related to U.S. patent application Ser. No. 11/935,876, entitled "Method an Apparatus for Augmenting a Mirror with Information Related to the Mirrored Contents and Motion," by inventors Takashi Matsumoto, Wei Zhang, James M. A. Begole, and Juan J. Liu, which is incorporated by reference in its entirety herein.

FIELD

The present disclosure relates generally to social networking. More specifically, the present disclosure relates to a method for facilitating social networking based on fashion-related information.

RELATED ART

Online social networks such as Facebook and Friendster are gaining increasing popularity on the Internet. These services facilitate easily accessible and far-reaching social networking based on descriptive information about users. Furthermore, online social networks are not limited by location, time, language, and media format, which are common constraints present in conventional telephone- or mail-based social networking services.

Most current online social-networking services require a user to manually input personal preferences and disclose some social affiliation, so that the service application can identify and recommend potential matches for the user's social circle. However, such manual-input process can be time consuming to the user. The unstructured information acquired by the system can also be inconsistent among different users.

An online social network usually allows a user to upload a variety of file formats, such as photos, video clips, and sound clips, to his or her profile. Nevertheless, most existing online social networks do not extract personal-preference information from multimedia files uploaded by a user.

SUMMARY

One embodiment of the present invention provides a system for facilitating social networking based on fashion-related information. During operation, the system receives fashion-related information from a user. Next, the system extracts the user's fashion preferences from the received information and compares the user's fashion preference with other users' fashion preferences. Furthermore, the system groups users based on similarity of their fashion preferences.

In a variation on this embodiment, receiving fashion-related information includes receiving an image of the user wearing one or more clothing items.

In a variation on this embodiment, extracting the user's fashion preferences includes extracting a vector of attributes from the fashion-related information.

In a further variation, the vector of attributes includes one or more of color, cut, style, size, material, fabric, texture, thickness, buttons, brand, function, comfort, pattern, weave, category and subcategories, collection, designer, price, fashion line, attractiveness, fashionableness, fit, durability, quality, symmetry, layering, country of origin, ease of care, laces, shine, user-defined tags, user demographics, a similarity measure to other users, user actions, a classifier which captures a user's preferences, and other attributes of clothing.

In a variation on this embodiment, grouping users includes clustering users into groups based on a similarity measure between two user's fashion preferences, identifying a group which is associated with the user from the groups, and ranking the other users in the group based on the user's fashion preferences.

In a further variation, clustering users into groups includes constructing a graph of users, wherein a cost of a link in the graph between a first user and a second user is inversely proportional to the similarity measure between the fashion preferences of the first user and the second user, and partitioning the graph of users into disjoint groups using a minimum-cost graph-cut approach, such that fashion preferences of a user within one group have a high similarity measure to fashion preferences of a user within the same group and a low similarly measure to fashion preferences of a user within a different group.

In a further variation, the system presents ranked users to the user, receives user feedback, and updating the user's fashion preferences based on the received feedback.

In a variation on this embodiment, the system recommends items to the user based on the user's fashion preferences and the fashion preferences of other users.

DETAILED DESCRIPTION

Figure 1A:
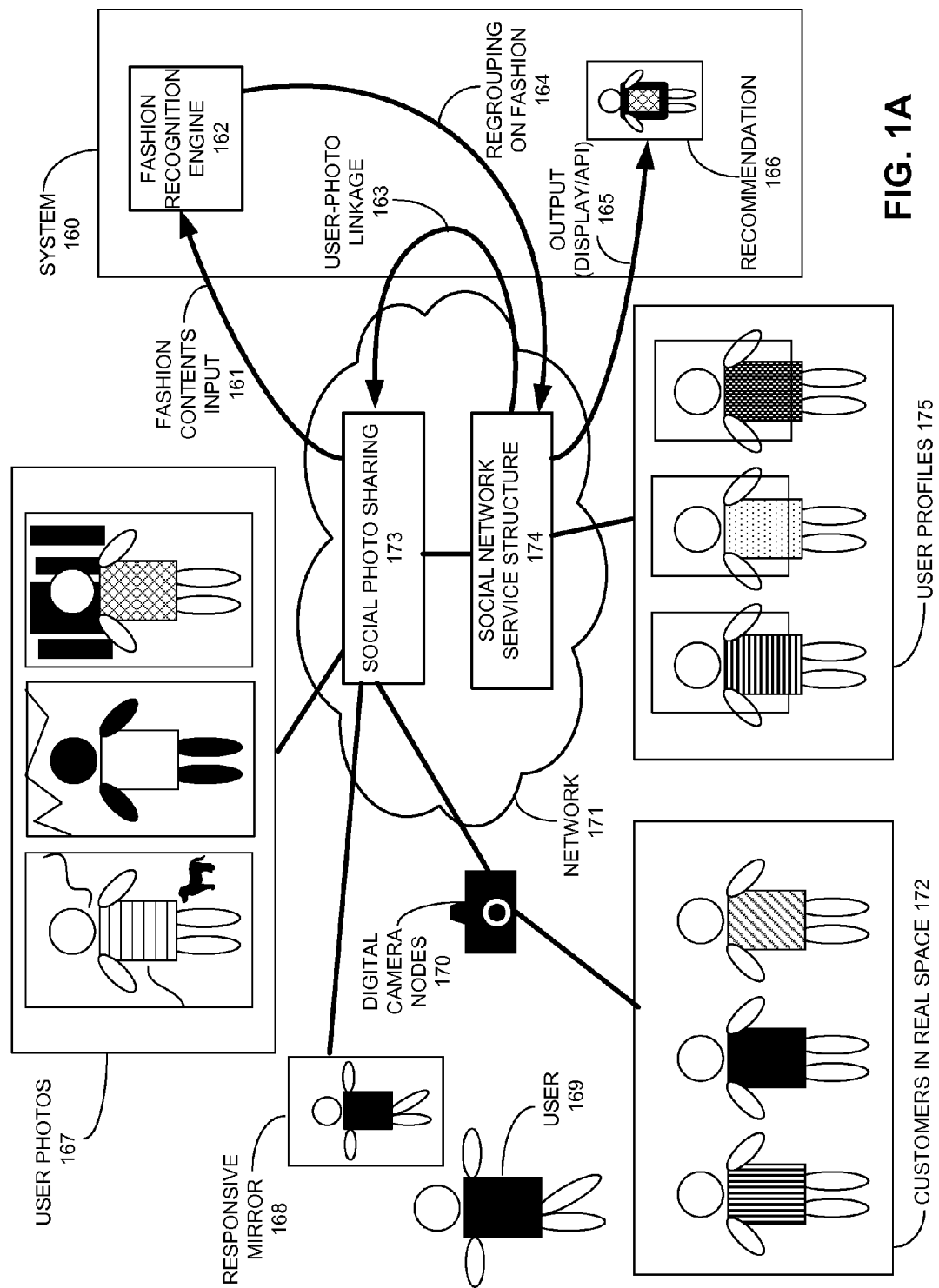
FIG. 1A illustrates a context of the system for facilitating social networking based on fashion-related

The following description is presented to enable any person skilled in the art to make and use the invention, and is provided in the context of a particular application and its requirements. Various modifications to the disclosed embodiments will be readily apparent to those skilled in the art, and the general principles defined herein may be applied to some embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

Overview

Embodiments of the present invention provide an online social fashion network that enables a user to explore her fashion statement in social groups by sharing fashion-related information such as images of the user wearing specific clothing. In one embodiment, the social network can automatically extract fashion-related information and create social groups based on similarities between fashion-related information associated with each user. The social groups can not only help the user make social connections based on their fashion preferences, but also reduce the user's effort in finding suitable clothes online or in-store. In further embodiments, the extracted fashion-related information can also be used to recommend non-clothing products to the user.

In one embodiment the social network is formulated as a weighted graph. The similarity of fashion preferences (link) between two users (nodes) can be measured by the similarities of their clothes in, for example, their fashion photographs. The system can identify fashion groups using a minimum-cost graph-cut method based on different style factors (attributes) such as color, texture, shape, and pattern. The system can then recommend clothing items and groups to the user with different options such as accept, bookmark, or reject.

The user's fashion photos can be shared in the network with different privacy options (e.g., for close friends only, for social group members only, or public to the whole network, or non-friends only). The social groups can be initialized by the system, and then updated based on the variation of group members, new fashion photo inputs and members' relevance feedbacks. The social fashion contents can also be used to improve a user's online shopping and in-store shopping experience by automatically retrieving the information helpful for exploring styles to decide on where and what to purchase.

FIG. 1A illustrates the general architecture of the system (system 160) in context of other systems from which it can send, receive, and share information, in accordance with an embodiment of the present invention. The system can retrieve fashion styles (fashion contents input 161) from various sources including commercial Social Photo Sharing services (item 173) such as Flickr or from a provided server. Images on the Social Photo Sharing service 173 include snapshots a user photos 167, which show fashion images on the body of a user; images of a user 169 generated for clothes recognition by a responsive mirror (as described in U.S. patent application Ser. No. 11/935,876, entitled "Method an Apparatus for Augmenting a Mirror with Information Related to the Mirrored Contents and Motion," by inventors Takashi Matsumoto, Wei Zhang, James M. A. Begole, and Juan Liu), and images received from digital camera nodes 170 of customers in real space 172. Images on the social photo sharing can exclude photos in which the clothes are not worn by a real person. Social photo sharing 173 can also include video from users, responsive mirrors, and customers in real space.

External social network service (SNS) structure 174 can store user profiles 175 and the relationship structure of their social relationship (friends, groups, etc). Examples of such SNSs include Facebook, Friendster, and Orkut.

System 160 includes a fashion recognition engine 162, which can receive fashion contents 161 from social photo sharing services 173. In turn, fashion recognition engine can group and regroup users based on fashion attributes and communicate that information (regrouping on fashion 164) to SNS 174.

The system can output (display/api) 165 a recommendation 166 to a user based on the social network structure 174. The user can take action upon the recommendation and notify the system of that action, which the user will then use to update its future recommendations for that user.

Communication with social photo sharing 173 and social network structure 174 can be through network 171, which includes social photo sharing 173 and social network service structure 174. Examples of such a network include the Internet, the World Wide Web, retail networks, and other private networks. Additionally, connections between fashion recognition engine 162, social photo sharing 173, and social network service structure can include connection service provided by one service provider, by an external module linked into an SNS platform, and by an external service that provides a mash-up service using API's (e.g., RockYou recommendation mashes up PhotoBucket and Like.com).

System Operation

Figure 1B:
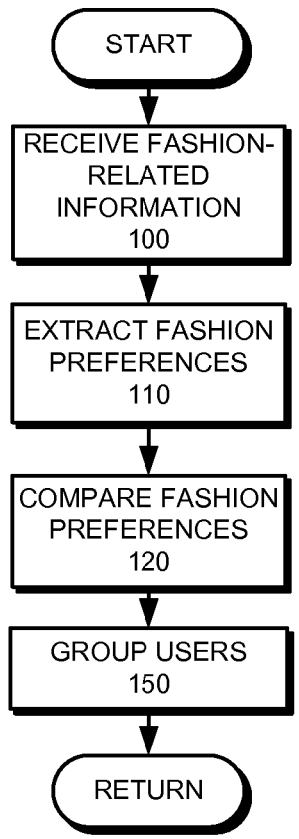
FIG. 1B presents a flowchart illustrating the operation of an exemplary system for facilitating social networking based on fashion-related information in accordance with one embodiment of the present invention.

FIG. 1B presents a flowchart illustrating the operation of an exemplary system for facilitating social networking based on fashion-related information in accordance with one embodiment of the present invention. During operation, the system receives fashion-related information from the user (operation 100). In one embodiment, the system can operationally use a security-based protocol, such as a username and password, in allowing the user to upload fashion-related information to his or her profile in an online social network. Fashion-related information can include images and/or videos of the user wearing clothing items and can also include other user demographic information such as geographic location, income level, employment information, and opinions of various products.

Next, the system extracts a user's fashion preferences from the fashion-related information (operation 110). Once the system has extracted the fashion preferences, the system compares the fashion preferences of the user with the fashion preferences of other users (operation 120). Finally, the system groups the user based on the similarity of their fashion preferences.

Receiving Fashion-Related Information

Figure 2:
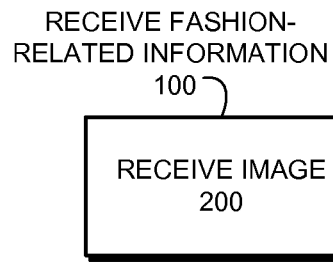
FIG. 2 presents an exemplary process for receiving fashion-related information in accordance with one embodiment of the present invention.

FIG. 2 presents an exemplary process for receiving fashion-related information (operation 100) in accordance with one embodiment of the present invention. The system can receive fashion-related information in several ways. In one embodiment, the system receives fashion-related information as an image (operation 200). The system can also receive different forms of fashion-related information, such as a video, textual representation of fashion, a classifier which captures a user's preferences, and demographic information such as the geographic location of the user, income level, employment information, and opinions of other products or items.

In one embodiment, the user can upload fashion-related information after logging into her profile in the online social network using her username and password. For example, the user can upload images of her wearing different clothing items and allow the public or her friends to view these images. The system can also use other forms of security mechanisms to enhance the protection of the user's privacy.

Extracting Fashion Preferences

Figure 3:
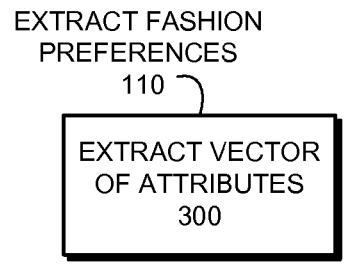
FIG. 3 presents an exemplary process for extracting fashion preferences in accordance with one embodiment of the present invention.

FIG. 3 presents an exemplary process for extracting fashion preferences (operation 110) in accordance with one embodiment of the present invention. In one embodiment, the system extracts a vector of attributes (operation 300) as a way to extract fashion preferences. The system can extract fashion preferences in several ways. For fashion-related information in the form of images or videos, the system can receive a bounding box, which in one embodiment is provided by the user, of the clothes in which the user is interested in the fashion-related information (as represented by an image). For example, if the user is particularly interested in shoes, the system can allow the user to input a bounding box that encompasses the shoes in the image or video. The system can also receive a bounding box of the user's entire body in an image or video. The system can then use various methods to detect different body parts automatically. For example, the system can use heuristic ratios of body part proportions and possibly combine them with texture-based image segmentation and skin detection. The system can also receive an image or video of the user that is clearly separated from a background. The system can then use various methods to detect the body by separating the background from the body. In further embodiments, the system can receive an image or video without any other input. In this situation the system can identify the clothes by detecting the face with various face-detection methods, identify body parts below the head, and combine texture-based image segmentation with skin detection. The system can then present the resulting detection to the user for adjustment (if necessary).

Other fashion preferences such as color or texture can be similarly extracted from the fashion information. A user's demographic information can also be obtained or extracted, and stored in addition to the image or video information. A user's fashion preferences can also include the user's opinions of various products, which might correlate with fashion choices of the user or other users.

Regardless of the form of the fashion-related information, e.g., images, videos, or demographic information associated with the user, the system extracts an attribute vector (operation 300) corresponding to the values associated with the fashion-preferences from the fashion-related information.

The Attribute Vector

The attribute vector can be viewed as a data structure, indexed by each attribute, and whose contents include the values of each attribute. The attribute vector can include any fashion-related preferences, such as color, cut, style, size, material, fabric, texture, thickness, buttons, brand, function, comfort, pattern, weave, category and subcategories, collection, designer, price, fashion line, attractiveness, fashionableness, fit, durability, quality, symmetry, layering, country of origin, ease of care, laces, shine, user-defined tags, user demographics, a similarity measure to other users, user actions, a classifier which captures the user's fashion preferences, and other attributes of clothing.

User actions can include trying on particular clothes or selecting clothes from a rack but not trying on those clothes. For example, an action can be a user trying on a particular shirt or selecting a shirt from a rack but then not trying it on. User actions can also include trying on or selecting from a rack by not trying on clothes with specific attributes such as color, cut, style, size, material. In general, an action can include any event (or lack of event) involving a user and clothing.

In one embodiment, each attribute has a value, which can be binary, discrete, integer, or continuous. For example, size can be an integer value whereas color might be discrete. Furthermore, a color can be specified in red, blue, and green attributes, each of which has continuous values. The choice of attributes and their values affects quality and type of similarity measure, which is described in subsequent sections.

In some embodiments, the system can also infer the values of attributes based on other attribute values and external prior knowledge. For example, the system might infer that someone who likes Prada® brand clothes might also like shoes by Manolo Blahnik®.

Grouping Users

Figure 4A:
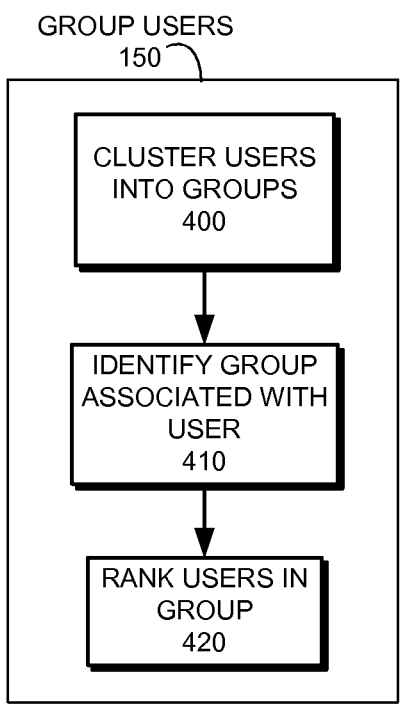
FIG. 4A presents a flowchart illustrating an exemplary process for grouping users in accordance with one embodiment of the present invention.

In one embodiment, the system clusters the users into groups based their fashion preferences. FIG. 4A presents a flowchart illustrating an exemplary process for grouping users (operation 150) in accordance with one embodiment of the present invention. During operation, the system first clusters users into groups based on a similarity measure between two user's fashion preferences (operation 400). Next, the system identifies from the clustered users a group which is associated with the user based on the user's fashion preferences (operation 410). Subsequently, the system ranks the other users in the group based on the user's fashion preferences (operation 420).

The system can use various methods for clustering the users into groups based on a similarity measure of fashion preferences. Generically, these methods are often called spectral clustering since they involve grouping of objects based on a similarity measure between any two objects. In some embodiments of the present invention, the items include a user's fashion preferences.

The result of clustering is a set of groups. In some embodiments of the present invention, the groups can have sharp (definite) borders. In some embodiments of the present invention, the groups can have fuzzy (probabilistic) borders. With sharp borders, each user can be associated with a clearly identified group. With fuzzy borders, each user can be associated with more than one group or with a most likely group, based on the definition of the fuzzy border.

Once the system has identified a group which is associated with the user, it can rank the users in the group according to the user's fashion preferences. For example, if the user is primarily interested in clothing associated with sports activities, the users in the group can be ranked based on their clothing and its association with sports activities. Users can be ranked according to other fashion preferences such as clothing attributes, geographic location, age, and income level. Fashion preferences can thus encompass the information on which ranking is based.

Clustering

Figure 4B:
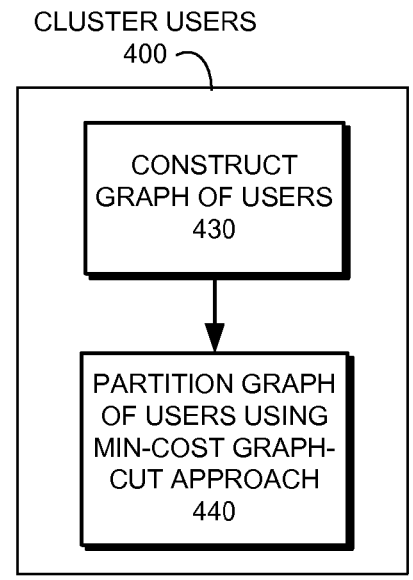
FIG. 4B presents a flowchart illustrating an exemplary process for clustering users in accordance with one embodiment of the present invention.

FIG. 4B presents a flowchart illustrating an exemplary process for clustering users in accordance with one embodiment of the present invention. During the clustering process the system first constructs a graph of users (process 430), wherein a cost of a link in the graph between a first user and a second user is inversely proportional to the similarity measure between the fashion preferences of the first user and the second user. Next, the system partitions the graph of users into disjoint groups using a minimum-cost graph-cut approach (process 440), such that fashion preferences of a user within one group have a high similarity measure to fashion preferences of a user within the same group and a low similarly measure to fashion preferences of a user within a different group.

Similarity Measure

Figure 5:
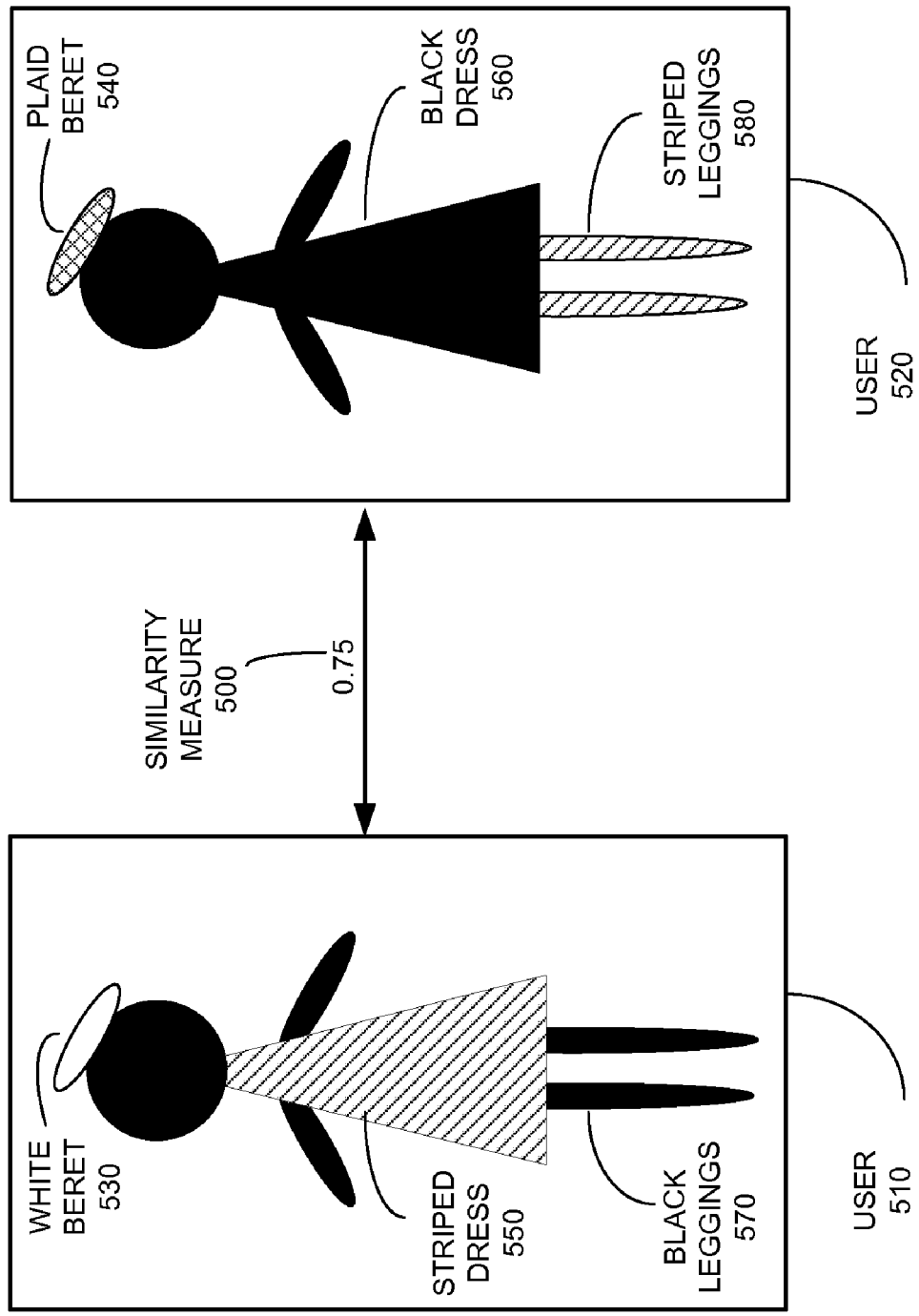
FIG. 5 illustrates an exemplary similarity measure of fashion preferences between the two users in accordance with one embodiment of the present invention.

FIG. 5 illustrates an exemplary similarity measure of fashion preferences between two user 510 and user 520, in accordance with one embodiment of the present invention. In some embodiments of the present invention the similarity measure is expressed as a real-valued quantity between 0 (completely dissimilar) and 1 (completely similar). For example, FIG. 5 shows a similarity measure of 0.75, suggesting that these two users are fairly similar. In some embodiments, the similarity measure can be an integer, an unbounded real-value, or a qualitative (discrete) measure.

The similarity measure is based on fashion preferences, which in turn can include one or more attributes and their values. For example, FIG. 5 shows that the fashion preferences of user 510 include a white beret 530, a striped dress 550, and black leggings 510. In contrast, the fashion preferences of the user 520 include a plaid beret 540, a black dress 560, and striped leggings 580. The similarity measure between these two users, based on the fashion preferences, is 0.75. The system computes a similarity measure by combining multiple similarity measures associated with multiple attribute values, which in turn are associated with the fashion preferences. The similarity measure can weight each attribute as part of the calculation of similarity. For example, the similarity measure can weigh the hat pattern attribute more heavily than the dress pattern and leggings pattern attributes.

Various other methods can be used to calculate the similarity including Euclidean distance, Mahalanobis distance, absolute distance, Hamming distance, and edit distance. For example, the Euclidean distance between one or more real-valued attributes is the square root of sum of the square of the differences between the attribute values. The system can assign real-values to each attribute as part of this calculation. For example, the system can assign a white beret a value of 0, a black beret a value of 1, a grey beret a value of 0.5, a plaid beret a value of 0.25, and similar values for the pattern on a dress and leggings. Given such values, the system can then calculate the Euclidean distance between any two objects. Additionally, the system can weight the sum of the squares in the Euclidean distance based on a weighting function.

In sum, the system calculates the similarity measure by combining one or more similarity calculations between attribute values associated with the fashion preferences of two users.

Additional Details on Clustering

Figure 6:
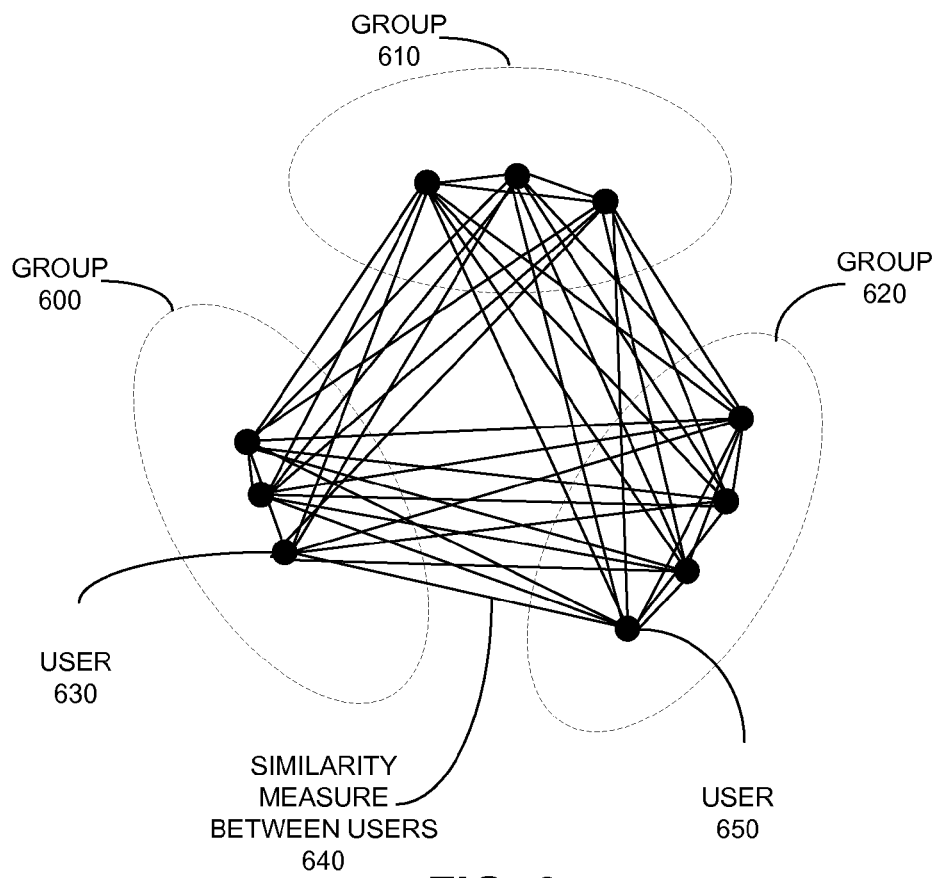
FIG. 6 illustrates an exemplary clustering of users based on a similarity measure of fashion preferences between two users in accordance with one embodiment of the present invention.

FIG. 6 illustrates an exemplary clustering of users into three groups (Group 600, Group 610, and Group 620) based on a similarity measure of fashion preferences between of any two users, in accordance with one embodiment of the present invention. In one embodiment, the system constructs a graph, wherein a user is represented as a node, and the edge between two nodes has a cost or weight based on the similarity measure of fashion preferences of the two corresponding users. As illustrated in FIG. 6, a similarity measure (element 640) corresponds to the cost of the edge between user 630 and user 650. In one embodiment, the system constructs a fully connected graph and assigns a cost or weight to each edge based on the similarity measure between the two users represented by the two nodes connected by the edge.

The system can cluster users into groups by various spectral clustering methods. Spectral clustering comprises a class of clustering methods that are based on a similarity measure between items to be clustered. Some embodiments of the present invention are based on a spectral clustering method which partitions users into disjoint groups using a minimum-cost graph-cut approach. As a result, fashion preferences of a user within one group have a high similarity measure to fashion preferences of a user within the same group and a low similarly measure to fashion preferences of a user within a different group.

The system groups a user associated with group 600 with other users of group 600 because users within group 600 are more similar to each other than to the users of groups 610 and groups 620. FIG. 6 illustrates similarity between two users as follows: short lines represent high similarity and long lines represent low similarity. In this example, the system uses such information to partition the users into groups 600, 610, and 620.

The system can base its clustering on all, some, or a selected set of pre-determined attributes. For example, the system can base its clustering on one or more of attributes such as color, pattern, texture, and category (e.g. shirts, trousers, skirts, etc). Clustering solely on color might yield a different grouping than clustering solely on pattern.

Presenting Ranked Users, Receiving Feedback and Updating Fashion Preferences

Figure 7:
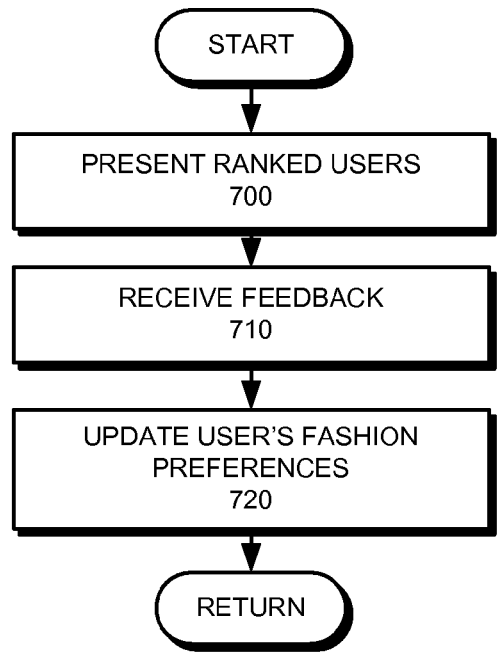
FIG. 7 presents a flowchart illustrating an exemplary process for presenting other ranked users in a fashion-preference group to a user, receiving feedback from the user, and updating the user's fashion preferences based on the feedback, in accordance with one embodiment with one embodiment of the present invention.

FIG. 7 presents a flowchart illustrating an exemplary process for presenting other ranked users to a user in a fashion-preference group, receiving feedback from the user, and updating the user's fashion preferences based on the received feedback, in accordance with one embodiment with one embodiment of the present invention. During operation, after the system has clustered users into fashion-preference groups, the system can rank the users within a group based on their respective similarity-measure of fashion preferences, and present the other ranked users to a user within a group (operation 700). Subsequently, the system allows the user to provide feedback based on the other ranked users. For example, the user can indicate with a numerical value how much he or she identifies with the fashion preferences of other users in the group. The system then receives the user feedback (operation 710). The system then update the user's fashion preferences accordingly (operation 720).

In one embodiment, once the user is presented with other ranked users, the user can browse through that list and the system can receive requests from the user to browse through the fashion preferences of other users. Thus, the system can allow a user to identify other users with similar fashion preferences by following the links of people who are in the same group.

In a further embodiment, the system can respond to requests for browsing based on security measures associated with the user and other users. For example, a user can designate certain fashion preferences as private (no one other than the user can view them), shared (other selected users can see them), public-to-group (only users within the same fashion-preference group can see them), or public (any user can see them).

The system can also facilitate identifying emerging fashion trends. For instance, fashion-preference clusters may correspond to such trends, which can be tracked over time. This can enable market research applications to automatically create consumer segments and alert marketers to emerging segments.

Fashion has long been considered a very subjective topic. Instead of presenting users ranked with a generic definition of fashion, the system can update a user's fashion preferences by receiving feedback from the user. In one embodiment, the user's fashion preferences can include a classifier that ranks users based on fashion preferences. In particular, the system can use a Bayesian classifier to rank users based on a user's fashion preferences. The higher the probability that a user likes a particular fashion preference based on the Bayesian classifier, the higher the ranking.

The system can initialize the classifier based on the fashion related information associated with the user or other users. The system can then use various machine learning methods such as relevance feedback to update the classifier based on feedback from the user. In general, relevance feedback learning methods update a classifier based on feedback from a user. The system can use various forms of feedback. For example, the system can receive a rating corresponding to how much a user likes or dislikes a particular user's fashion preferences. The system can periodically update the Bayesian classifier based on collected feedback.

The system can also update the fashion preferences of multiple users based on various distance learning methods. In general, a distance learning method is given items and their membership in groups and learns a distance function between items. Specifically, the system can update the similarity measure given a set of groups and their members based on various distance learning methods and feedback from the user. The feedback can include a user joining a group, a user refusing to join a group, or a user remaining uncommitted to joining a group. Note that a user's fashion preferences can include a similarity measure for that user relative to one or more other users. As part of this process, the system can also remove outliers within each group using various outlier removal methods. The system can periodically update the similarity measure. The system can also periodically update the groups of users by re-clustering the users based on user feedback.

Item Recommendation

In some embodiments of the present invention, a fashion-based social network application can recommend clothes-related or other items to the users based on their fashion preferences. For example, the system can use various collaborative filtering methods to recommend items to one user based on the fashion preferences of the user and the fashion preferences of other users. In general, collaborative filtering is the process of filtering for information or patterns using techniques involving collaboration among multiple agents, viewpoints, and data sources. Collaborative filtering involves predicting the interests of one user based on the interests of other users. Typically, collaborative filtering involves the following two steps: finding users who have similar interests to those of a target user and using the interests of those users to predict the interest of the target user.

Figure 8:
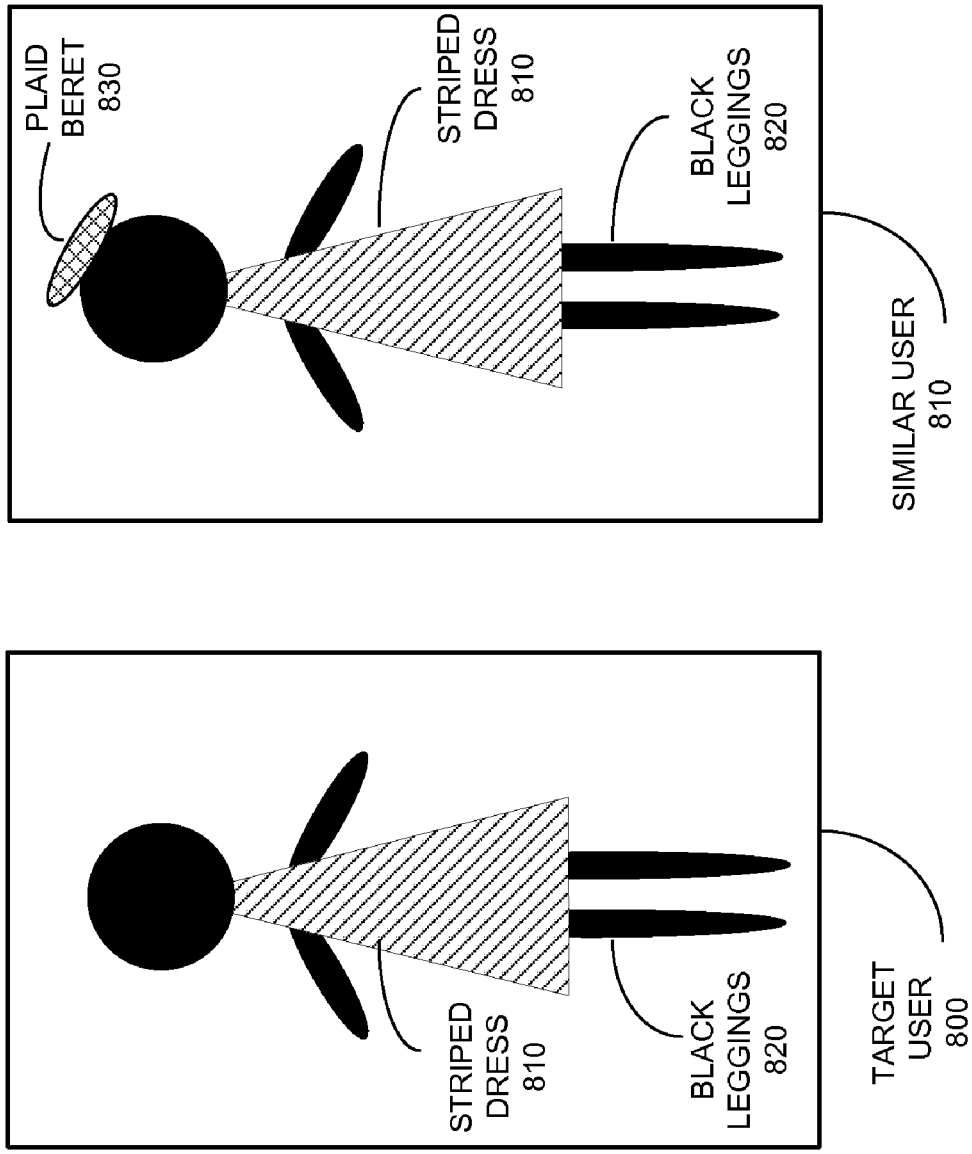
FIG. 8 illustrates an exemplary process of recommending an item to the user based on the fashion preferences of the user and the fashion preferences of other users, in accordance with one embodiment of the present invention.

FIG. 8 illustrates an exemplary process of recommending an item to the user based on the fashion preferences of the user and the fashion preferences of other users in accordance with one embodiment of the present invention. Specifically, FIG. 8 illustrates the process of making a recommendation to a target user 800. In the figure, the system identifies a user 810 with similar interests. In some embodiments of the present invention, the same similarity measure is used to find users with similar interests. Target user 800's interests are characterized by the fashion preferences shown in the figure: striped dress 810 and black leggings 820. Similar user 810's interests are characterized by the fashion preferences shown in the figure: striped dress 810, black leggings 820, and plaid beret 830. Since target user 800 and similar user 810 have the same interests (except for plaid beret 830), the system recommends the plaid beret 830 to target user 800. The system can solicit feedback from the user after a recommendation is made and then update its recommendations based upon the feedback.

Note that recommendations can involve any type of item and that the system can recommend across item categories. For example, the system can recommend a brand of beer based on specific clothing and vice versa. The system can also recommend other products and services such as books, movies, food, restaurants, grocery stores, and cars.

Computer and Communication System

Figure 9:
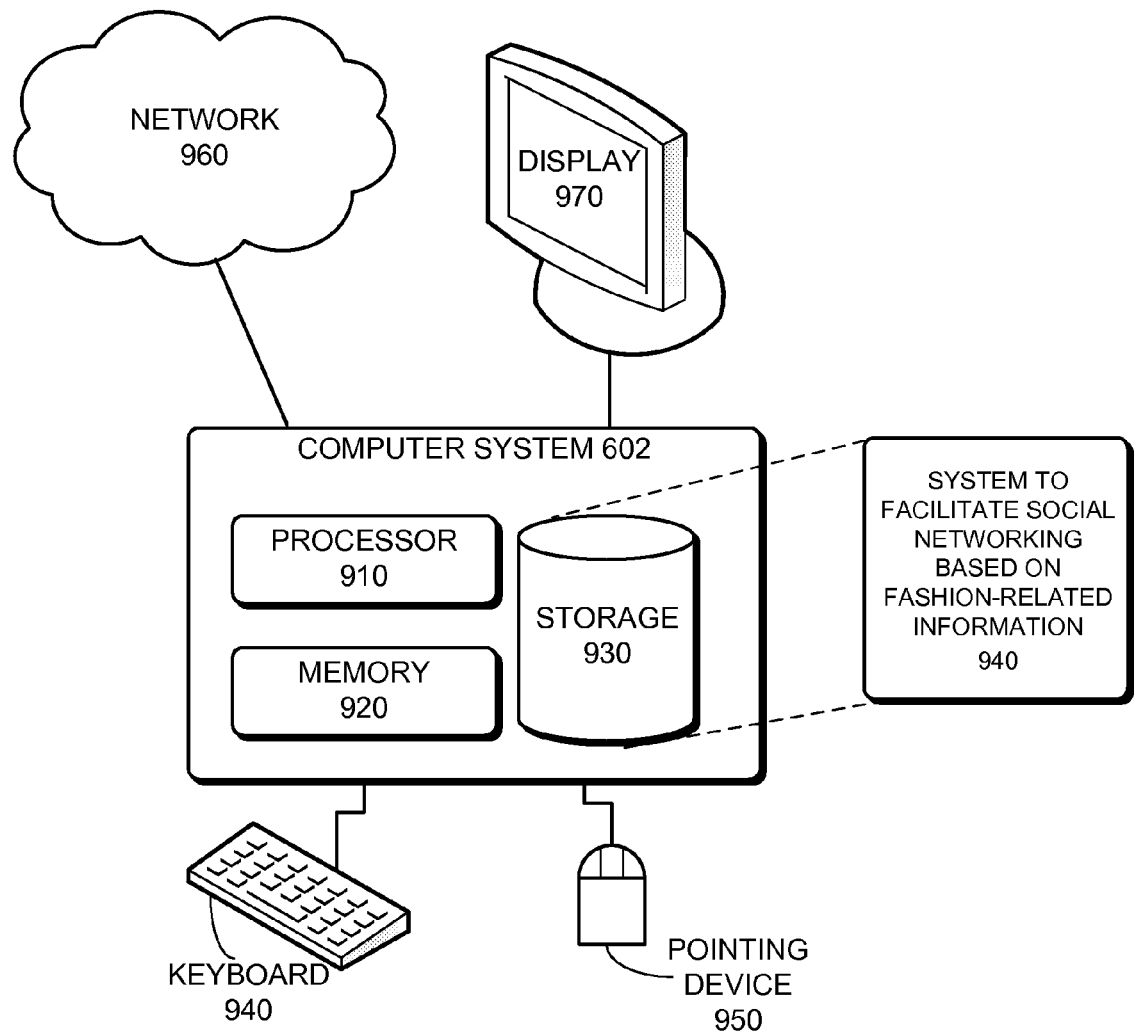
FIG. 9 presents an exemplary computer system for facilitating social networking based on fashion-related information in accordance with an embodiment of the present invention.

FIG. 9 presents an exemplary computer system for facilitating social networking based on fashion-related information in accordance with an embodiment of the present invention. In FIG. 9, a computer and communication system 900 includes a processor 910, a memory 920, and a storage device 930. The computer and communication system is also coupled to network 960, display 970, keyboard 940, and a pointing device 950.

Storage device 930 stores programs to be executed by processor 910. Specifically, storage device 930 stores a program that implements a system for facilitating social networking based on fashion-related information 940. During operation, the program for facilitating social networking based on fashion-related information 940 is loaded from storage device 930 into memory 920 and is executed by processor 910.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for facilitating social networking based on fashion-related information, comprising:

receiving, by a server computer, user images from a first user and a plurality of different users, wherein a first user image received from the first user includes the first user wearing a first set of clothing items, and wherein an image received from a respective user of the plurality of different users includes the respective user wearing a set of clothing items;

receiving from the first user and the respective user of the plurality of different users, fashion-related information that includes a bounding box for a corresponding user image, wherein fashion-related information received from the first user includes a first bounding box in the first image, wherein the first bounding box identifies a portion of the first image that includes a first clothing item from the first set of clothing items, and wherein fashion-related information received from the respective user of the plurality of different users includes a bounding box that identifies a portion of a corresponding image that includes a clothing item from the set of clothing items;

extracting, from portions of the received images identified by corresponding bounding boxes, user-preference attributes that indicate fashion preferences for the first user and the respective user of the plurality of different users, wherein first user-preference attributes extracted from the first image indicate the first user's fashion preferences from at least the first clothing item within the identified portion of the first image;

grouping the first user and one or more of the different users based on a similarity measure that combines weighted values of a comparison between the first user-preference attributes and user-preference attributes from the one or more of the plurality of different users, a user feedback process, and a fashion preference classifier; and recommending to the first user a different clothing item in the received images worn by the one or more of the different users which share similar fashion preferences in the same group as the user.

2. The method of claim 1, wherein extracting the user-preference attributes further comprises extracting a vector of additional user-preference attributes from the fashion-related information.

3. The method of claim 2, wherein the vector of additional user-preference attributes comprises user demographics and one or more of: size, material, fabric, texture, thickness, buttons, brand, function, comfort, pattern, weave, category and subcategories, collection, designer, price, fashion line, attractiveness, fashionableness, fit, durability, quality, symmetry, layering, country of origin, ease of care, laces, shine, user-defined tags, a similarity to other users, user actions, and a classifier which captures a user's preferences.

4. The method of claim 1, wherein grouping users comprises:
clustering users into groups based on the similarity measure between the first user's and the plurality of different users' fashion preferences;
identifying, from the groups, a group which is associated with the first user; and
ranking the different users in the group using the fashion preference classifier based on the first user's fashion preferences.

5. The method of claim 4, wherein clustering users into groups further comprises:
constructing a graph of users, wherein a cost of a link in the graph between two respective users is inversely proportional to the similarity measure between the fashion preferences of the two respective users; and
partitioning the graph of users into disjoint groups using a minimum-cost graph-cut approach, such that fashion preferences of the first user within a first group have a high similarity measure to fashion preferences of a second user within the first group and a low similarity measure to fashion preferences of a third user within a different group.

6. The method of claim 4, wherein the feedback process further comprises:
presenting to the first user the ranked other users in the same group as the first user;
receiving user feedback from the first user; and
updating the first user's fashion preferences based on the received feedback.

7. The method of claim 1, further comprising recommending items to the first user based on the first user's fashion preferences and the fashion preferences of the different users.

8. A computer system for facilitating social networking based on fashion-related information, comprising:
a processor;
a memory;
a coupling to a network;
a receiving mechanism which is coupled to the processor and configured to:
receive user images from a first user and a plurality of different users, wherein a first user image received from the first user includes the first user wearing a first set of clothing items, and wherein an image received from a respective user of the plurality of different users includes the respective user wearing a set of clothing items; and
receive from the first user and the respective user of the plurality of different users, fashion-related information that includes a bounding box for a corresponding user image, wherein fashion-related information received from the first user includes a first bounding box in the first image, wherein the first bounding box identifies a portion of the first image that includes a first clothing item from the first set of clothing items, and wherein fashion-related information received from the respective user of the plurality of different users includes a bounding box that identifies a portion of a corresponding image that includes a clothing item from the set of clothing items;
an extraction mechanism which is coupled to the processor and configured to extract user-preference attributes that indicate fashion preferences for the first user and the respective user of the plurality of different users, wherein first user-preference attributes extracted from the first image indicate the first user's fashion preferences from at least the first clothing item within the identified portion of the first image;
a grouping mechanism which is coupled to the processor and configured to group the first user and the one or more of the plurality of different users based on a similarity measure that combines weighted values of a comparison between the first user-preference attributes and user-preference attributes from the one or more of the plurality of different users, a user feedback mechanism, and a fashion preference classifier; and
a recommending mechanism which is coupled to the processor and the display, and configured to recommend to the first user a different clothing item in the received images worn by the one or more of the plurality of different users which share similar fashion preferences in the same group as the user.

9. The computer system of claim 8, wherein the extraction mechanism is further configured to extract a vector of additional user-preference attributes from the fashion-related information.

10. The computer system of claim 9, wherein the vector of additional user-preference attributes comprises user demographics and one or more of size, material, fabric, texture, thickness, buttons, brand, function, comfort, pattern, weave, category and subcategories, collection, designer, price, fashion line, attractiveness, fashionableness, fit, durability, quality, symmetry, layering, country of origin, ease of care, laces, shine, user-defined tags, a similarity to other users, user actions, a classifier which captures a user's preferences, and other user-preference attributes of clothing.

11. The computer system of claim 8, wherein the grouping mechanism is further configured to:
cluster users into groups based on the similarity measure between the first user's and the plurality of different users' fashion preferences;
identify a group which is associated with the first user from the groups; and
rank the different users in the group using the fashion preference classifier based on the first user's fashion preferences.

12. The computer system of claim 11, wherein while clustering users into groups, the clustering mechanism is further configured to:
construct a graph of users, wherein a cost of a link in the graph between two respective users is inversely proportional to the similarity measure between the fashion preferences of the two respective users; and
partition the graph of users into disjoint groups using a minimum-cost graph-cut approach, such that fashion preferences of the first user within a first group have a high similarity measure to fashion preferences of a second user within the first group and a low similarity measure to fashion preferences of a third user within a different group.

13. The computer system of claim 8, wherein the feedback mechanism is coupled to the processor and the pointing device, and configured to:
present ranked users to the first user;
receive user feedback from the first user; and
update the first user's fashion preferences based on the received feedback.

14. The computer system of claim 8, further comprising a recommendation mechanism which is coupled to the processor and the coupling to the network, and configured to recommend items to the first user based on the first user's fashion preferences and the fashion preferences of the different users via the network.

15. A non-transitory computer-readable storage medium storing instructions that when executed by a computer cause the computer to perform a method for facilitating social networking based on fashion-related information, the method comprising:
receiving, by a server computer, user images from a first user and a plurality of different users, wherein a first user image received from the first user includes the first user wearing a first set of clothing items, and wherein an image received from a respective user of the plurality of different users includes the respective user wearing a set of clothing items;
receiving, from the first user and the respective user of the plurality of different users, fashion-related information that includes a bounding box for a corresponding user image, wherein fashion-related information received from the first user includes a first bounding box in the first image, wherein the first bounding box identifies a portion of the first image that includes a first clothing item from the first set of clothing items, and wherein fashion-related information received from the respective user of the plurality of different users includes a bounding box that identifies a portion of a corresponding image that includes a clothing item from the set of clothing items;
extracting, from portions of the received images identified by corresponding bounding boxes, user-preference attributes that indicate fashion preferences for the first user and the respective user of the plurality of different users, wherein first user-preference attributes extracted from the first image indicate the first user's fashion preferences from at least the first clothing item within the identified portion of the first image;
grouping the first user and one or more of the different users based on a similarity measure that combines weighted values of a comparison between the first user-preference attributes and user-preference attributes from the one or more of the plurality of different users, a user feedback process, and a fashion preference classifier; and
recommending to the first user a different clothing item in the received images worn by the one or more of the different users which share similar fashion preferences in the same group as the user.

16. The non-transitory computer-readable storage medium of claim 15, wherein extracting the user-preference attributes further comprises extracting a vector of additional user-preference attributes from the fashion-related information.

17. The non-transitory computer-readable storage medium of claim 16, wherein the vector of additional user-preference attributes comprises user demographics and one or more of size, material, fabric, texture, thickness, buttons, brand, function, comfort, pattern, weave, category and subcategories, collection, designer, price, fashion line, attractiveness, fashionableness, fit, durability, quality, symmetry, layering, country of origin, ease of care, laces, shine, user-defined tags, a similarity to other users, user actions, a classifier which captures a user's preferences, and other user-preference attributes of clothing.

18. The non-transitory computer-readable storage medium of claim 15, wherein grouping users further comprises:
clustering users into groups based on the similarity measure between the first user's and the plurality of different users' fashion preferences;
identifying a group which is associated with the first user from the groups; and
ranking the different users in the group using the fashion preference classifier based on the first user's fashion preferences.

19. The non-transitory computer-readable storage medium of claim 18, wherein clustering users into groups further comprises:
constructing a graph of users, wherein a cost of a link in the graph between two respective users is inversely proportional to the similarity measure between the fashion preferences of the two respective users; and
partitioning the graph of users into disjoint groups using a minimum-cost graph-cut approach, such that fashion preferences of the first user within a first group have a high similarity measure to fashion preferences of a second user within the first group and a low similarity measure to fashion preferences of a third user within a different group.

20. The non-transitory computer-readable storage medium of claim 15, wherein the feedback process further comprises:
presenting ranked users to the first user;
receiving user feedback from the first user; and
updating the first user's fashion preferences based on the received feedback.

21. The non-transitory computer-readable storage medium of claim 15, wherein the method further comprises recommending items to the first user based on the first user's fashion preferences and the fashion preferences of the different users.

* * * * *